March 8, 1949.　　　　C. W. HARRISON　　　　2,463,616
TEST CIRCUIT FOR PIEZOELECTRIC CRYSTALS
Filed Feb. 7, 1945　　　　　　　　　　　　　　3 Sheets-Sheet 1

INVENTOR
C. W. HARRISON
BY Walter M. Hill
ATTORNEY

March 8, 1949. C. W. HARRISON 2,463,616
TEST CIRCUIT FOR PIEZOELECTRIC CRYSTALS
Filed Feb. 7, 1945 3 Sheets-Sheet 2

INVENTOR
C. W. HARRISON
BY Walter M. Hill
ATTORNEY

Patented Mar. 8, 1949

2,463,616

UNITED STATES PATENT OFFICE 2,463,616

TEST CIRCUIT FOR PIEZOELECTRIC CRYSTALS

Charles W. Harrison, Flushing, N. Y., assignor to Bell Telephone Laboratories, Incorporated, New York, N. Y., a corporation of New York Application February 7, 1945, Serial No. 576,659

8 Claims. (Cl. 175—183)

This invention relates to electrical testing and more particularly to the testing of piezoelectric crystals to be used in oscillators and in analogous circuits.

In the copending application of Irvin E. Fair, Serial No. 574,953, filed January 27, 1945, now Patent No. 2,448,581, issued September 7, 1948, there is defined a new quality factor called the "performance index" which is peculiar to piezoelectric crystals and of particular value in determining the quality and performance of such crystals when used in oscillator circuits. The circuits and theory described therein are basically identical to those described in this application. Calibration difficulties were encountered, however, when attempts were made to measure the absolute value of the performance index of crystals which oscillate at the higher frequencies. It was discovered that these difficulties were due in part to the difficulty in measuring with precision some of the small capacitances required in the test circuit and in part to the appearance of unavoidable stray reactances which became appreciably small at the higher frequencies and which varied sufficiently from one test set to the cause considerable error in the measured absolute values of the performance index.

Since there are no primary standards available for the standardization or calibration of a performance index measuring instrument it necessarily follows that the instruments must be self-calibrating by means of apparatus or circuits having circuit parameters of known magnitudes. At the higher frequencies some of these circuit parameters are very difficult of accurate evaluation and it becomes necessary to determine the circuit constants by indirect means which means should be part of the internal calibrating apparatus of the test set.

The performance index was defined in the aforementioned copending application by the following expression:

$$PI = \frac{X_{L_C} X_{C_2}}{R_C} = \frac{\omega L_C}{\omega C_2 R_C} = \frac{L_C}{C_2 R_C} \quad (1)$$

where:

PI = "Performance index."
$X_{L_C}$ = Equivalent inductive reactance of crystal at test frequency.
$R_C$ = Equivalent resistance of crystal at test frequency.
$X_{C_2}$ = Capacity reactance at test frequency of the external circuit capacitance $C_2$ in shunt with the crystal.
$L_C$, $R_C$ = Equivalent inductance and equivalent resistance of crystal, respectively.
$\omega$ = Test frequency multiplied by $2\pi$.

In the above expression the performance index is arbitrarily defined as the ratio of the product of the equivalent inductive reactance of the crystal times the reactance of the external capacitance to the equivalent resistance of the crystal at the test frequency. Since both the equivalent crystal reactance and equivalent resistance are functions of frequency it is important that the test frequency be very accurately and precisely controlled in order to properly measure the performance index. It will be apparent that the performance index as thus defined takes into account several important fundamental parameters of the crystal. These factors are particularly useful not only to indicate the crystal quality but the performance index is also useful as important design data.

It is the object of this invention to provide a self-calibrating circuit means for quickly and accurately measuring the performance index of a piezoelectric crystal.

It is a further object of this invention to provide a self-calibrating means for a performance index measuring instrument which will correctly take into account stray reactances in the measuring circuit as well as to take into account the effect of some of the small capacity reactances which are necessary parts of the test circuit but which are difficult of precise evaluation by direct means.

The foregoing objects are attained by this invention by providing in combination with the crystal to be tested a source of alternating current the frequency whereof is maintained equal to a predetermined operating frequency of the crystal under test, a capacity means for coupling the crystal to the source for driving the crystal, a series comprising a resistance means and second capacity means coupled to the driving circuit so as to have impressed thereon a voltage substantially proportional to the voltage appearing across the first capacity means and a voltage measuring means connected across the second capacity means whereby the readings thereof will be a measure of the performance index of the crystal at the predetermined crystal operating frequency. A calibrating circuit is included as an integral part of the test set and comprises a calibrating capacitor and a calibrating resistor connected in series and to a source of alternating electric energy, a first calibrating switching means for temporarily uncoupling from the first capacity means the first-named series circuit comprising said resistance means and second capacity means and to selectively couple said first-named series circuit to either another part of said first capacity means or to the calibrating resistor per se, and a second calibrating switching means for temporarily short-circuiting the crystal under test.

The invention may be better understood by referring to the accompanying drawing in which:

Fig. 1A discloses the equivalent electrical network of a piezoelectric crystal;

Fig. 1B discloses the equivalent electrical network of the same crystal oscillating at a frequency between its resonant and antiresonant frequencies in an oscillator circuit;

Fig. 2 is a circuit showing all the essential electrical circuit features of the invention;

Fig. 3 discloses the circuit set up in Fig. 2 with both calibrating switches in the test position;

Figure 1:
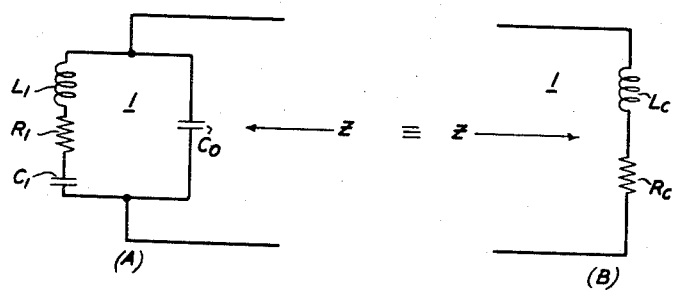

Referring now to Fig. 1A the network I represents the equivalent electrical network of a piezoelectric crystal. This is a conventional representation of the equivalent electrical parameters of a crystal and requires no lengthy discussion. It should be noted that the network comprises a shunt capacitance $C_0$ connected in parallel with a series circuit comprising an inductance $L_1$, resistance $R_1$, and capacitance $C_1$. It has been established that when a crystal is connected in an oscillator circuit it resonates somewhere between its resonant and antiresonant frequencies, these frequencies actually being rather close together. Moreover, it has also been established that the impedance of a crystal operating within this frequency range appears as a positive impedance or, more specifically, it appears as an inductive reactance in series with a resistance. This is shown in Fig. 1B in which the crystal network I is shown comprising a series circuit of inductance $L_c$ and resistance $R_c$. This inductance and resistance are the equivalent inductance and equivalent resistance of the crystal when connected to the oscillator circuit and operating at some frequency within the range above specified. Under these conditions the crystal impedance may be expressed in the well-known complex form as follows:

$$Z = R_c + j2\pi f L_c \qquad (2)$$

where $f$ = oscillator or test frequency.

Figure 2:
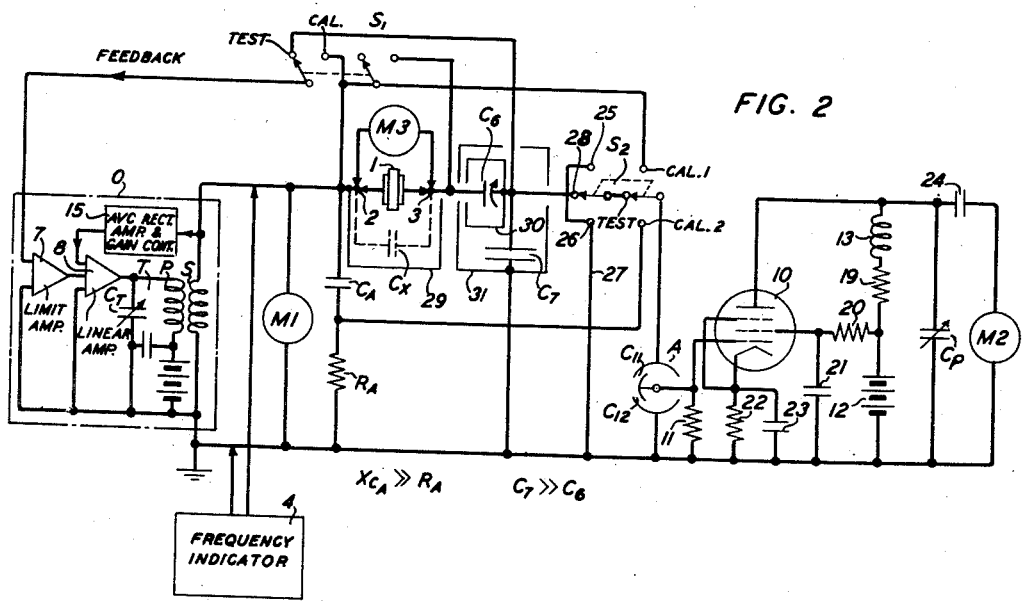

The basic features of the circuit as shown in Fig. 2 for measuring the performance index of a piezoelectric crystal are substantially identical with those disclosed in the aforementioned copending application. This circuit in addition shows the special features of this invention which enable the apparatus to be accurately calibrated for the absolute measurement of the performance index of crystals operating in the higher frequency ranges. It will be noted that the piezoelectric crystal I is connected to the test set by means of test terminals 2 and 3. A source of alternating current which may be an oscillator O provides current to the test circuit through a transformer comprising primary and secondary windings P, S respectively. The alternating current source O may be most any oscillator with automatic volume control and with its frequency under control of voltage derived from the crystal driving circuit. In this figure it will be noted that the frequency control voltage is derived from the drop across capacitor $C_7$ which will be found in series with the crystal I, a variable capacitor $C_6$ and the secondary winding S of the output transformer of the oscillator O. This voltage is fed back to the input circuit of the oscillator in proper phase to maintain oscillations at the oscillating frequency of the crystal whereby the source is automatically and rigidly maintained at the oscillating frequency of the crystal. This is a very important feature to the successful and convenient operation of this type of measuring equipment. Most any type of oscillator containing an automatic volume control and gain control means may be used in place of the particular arrangement shown. The only requirements are that the oscillator shall be of a type capable of being controlled in frequency by the crystal under test and that the voltage output of the oscillator must be under closely regulated automatic volume control as well as manual control of the output level. For these reasons the circuits as disclosed in block form in Fig. 2 are preferred. It will here be noted that the oscillator O comprises a limiting amplifier 7, a linear amplifier 8, an output transformer comprising a primary P and secondary S tuned by a tuning condenser $C_T$ and a feedback path from the crystal driving circuit to the input circuit of the limiting amplifier 7. The feedback path starts with the upper terminal of capacitor $C_7$ through the left-hand terminal and switch brush of switch $S_1$ and back to the input circuit of the limiting amplifier 7. This oscillator also contains an automatic volume control rectifier, amplifier and gain control means 15 each component of which may be of conventional well-known design. It is preferred that the time constant of the limiting amplifier be different and preferably somewhat less than that of the automatic volume control circuit in order to secure voltage stability.

Figure 8:
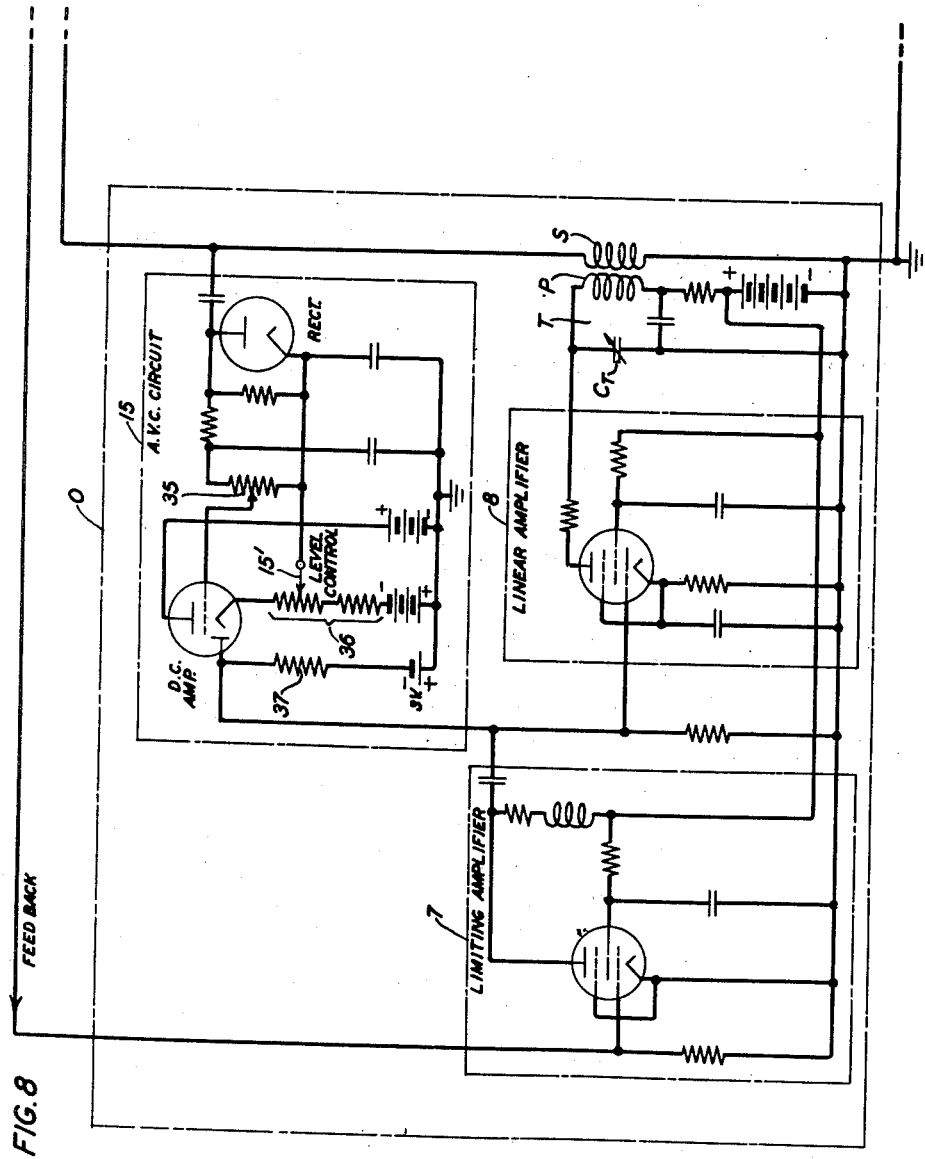
Fig. 8 discloses in greater detail the oscillator circuit of Fig. 2.

Reference may be made to Fig. 8 for more detailed information of typical circuits which may be inserted in the various blocks of the oscillator of Fig. 2. Here it will be noted that the component circuits are of quite conventional form and need no special description. Briefly, however, it may be said that the limiting amplifier 7 is of a very old and well-known overloaded type. The linear amplifier 8 is also conventional. Its gain is a function of its control grid voltage bias, a feature common to almost every automatic volume control amplifier circuit. The automatic volume control circuit 15 is of the amplified backward-acting type, also well known in the art.

In operation it will be noted that the original bias on the control grid of the linear amplifier 8 is supplied by the self bias of its cathode resistor plus some voltage from the 3-volt bias source in the diode circuit of the direct current amplifier tube, the diode being initially non-conducting. The voltage output from linear amplifier 8 will be rectified by the rectifier in circuit 15. As this voltage builds up it will produce an increasingly rectified output across potentiometer 35 to increase the negative bias of the grid of the direct current amplifier tube. This in turn reduces the space current through this tube and correspondingly lessens the voltage drop in its cathode resistance 36. When the voltage output from the linear amplifier 8 gets high enough the space current through resistance 36 is reduced to the point where the diode-anode becomes positive with respect to the cathode and current flows through the diode resistor 37 to rapidly increase the negative potential of the diode-anode to ground. Since this anode is connected directly to the control grid of amplifier 8, the bias on this grid is also increased rapidly to hold the oscillator output level at this point. The lever may be changed by adjusting control 15' which changes the amount of rectified output voltage required to start the diode current flowing. Potentiometer 35 adjusts the control range or control sensitivity of the circuit.

It is clearly obvious that while the particular combination of circuits 7, 8 and 16 is new many other well-known equivalent component circuits may be substituted for those specifically disclosed to provide the same function.

Shielding is desirable around the crystal and the coupling capacitors $C_6$ and $C_7$. This may conform to well established principles and, for example, may take the preferred form specifically shown in Fig. 2 where a shield 29 is connected to test terminal 2 and interposed between the crystal and the rest of the test circuit. This acts to simulate an equipotential plane beneath the crystal so that capacitances between the crystal mounting structure connected to terminal 2 and ground will be in shunt with the secondary winding S while the capacitance which would exist between the crystal structure connected to terminal 3 and the rest of the test circuit is confined to a path in shunt with the crystal and hence is part of a capacitance $C_x$ hereinafter more fully described.

Shield 30 surrounds variable capacitor $C_6$ as shown to substantially eliminate the stray capacitance between the stator of capacitor $C_6$ and ground which if permitted to exist would by-pass some of the current around capacitor $C_7$.

Shield 31, while it could be dispensed with, is helpful in eliminating energy transfer between shields 29 and 30.

A vacuum tube voltmeter M1 may be connected across the terminals of the secondary winding S of the oscillator. The output voltage read by this meter is applied as a driving voltage to a series circuit comprising the piezoelectric crystal 1 and the two capacitors $C_6$ and $C_7$. By reason of the fact that this driving voltage read by the vacuum tube voltmeter M1 is maintained rigorously constant by means of the automatic volume control circuit of the oscillator, it may be regarded as coming from a source of substantially zero impedance. Consequently, this driving voltage is effectively injected into the crystal branch of a parallel resonant network comprising the crystal 1 shunted by the capacitance $C_x$ and with the series-connected capacitors $C_6$ and $C_7$ effectively connected in parallel with the crystal branch. The total external capacitance connected in parallel with the crystal 1 may, therefore, be expressed by the following equation:

$$C_2 = C_x + \frac{C_6 C_7}{C_6 + C_7} \quad (3)$$

In the above equation the capacitance $C_2$ represents the total external capacitance effectively connected in parallel with the crystal 1 while in the test set. The various capacitances found in the right-hand member of the equation are as shown in Fig. 2. The capacitance $C_x$ represents the unavoidable stray capacitance found across the terminals 2 and 3 of the test circuit and includes the capacitance added by shield 29. This capacitance is relatively small in magnitude, difficult of accurate evaluation and varies from one instrument to another. The existence of this capacitance, however, has been found to have an appreciable effect upon the accuracy of the absolute measurement of the performance index of crystals at relatively high frequencies. The calibrating features of this invention are directed to the problem of eliminating the effect of this stray capacitance and to thereby improve the accuracy. In the design of this portion of the circuit the capacitance of capacitor $C_7$ is made large compared with the capacitance of variable capacitor $C_6$. It will therefore be observed that inasmuch as capacitance $C_x$ is also relatively small that the capacitance $C_2$ connected in parallel with the crystal 1 is approximately equal to the capacitance of capacitor $C_6$. It will therefore be seen that the magnitude of the shunting capacitance can be varied by adjusting the capacitance of $C_6$. This is useful, as will be hereinafter more particularly described, in adjusting the shunt capacitance presented by the test set to the crystal to equal the shunt capacitance presented to the crystal while in the commercial oscillator in which the crystal is ultimately to be used.

To aid in calibrating the instrument a calibrating capacitor $C_A$ is connected in series with a calibrating resistor $R_A$ and this series circuit is connected directly to the secondary winding S in the output circuit of the oscillator O. While other coupling means may be provided for connecting this calibrating circuit to the oscillator O, as for example that disclosed in the aforementioned copending application, the one here shown is very simple and is preferred for the calibrating scheme to be hereinafter more particularly described.

The frequency of the oscillator O may be determined by connecting a frequency indicator 4 to the output terminals. This frequency indicator 4 may comprise any well-known frequency indicator employing techniques well known in all laboratories engaged in high frequency measurements. One means suitable for determining this frequency is disclosed in United States Patent 2,283,616 issued May 19, 1942, to T. Slonczewski and F. R. Stansel.

The voltage drop appearing across capacitor $C_7$ (which is part of the capacitance means coupling the crystal to the source of electrical energy) is applied to the input terminals of a pentode 10 through a capacity attenuator A. The schematic representation of this pentode 10 is conventional. The normal bias for the control grid is obtained by means of a conventional cathode resistor 22 by-passed by the by-pass capacitor 23. The suppressor grid is connected directly to the cathode and the screen grid to the source 12 through a resistor 20 and is by-passed to ground by means of a capacitor 21. The plate is supplied from the direct current source 12 through the choke reactor 13 and plate resistor 19. The control grid is connected to ground through the grid resistor 11. Connected in the output circuit of this tube is a variable capacitor $C_P$ the reactance of which is preferably small compared with the alternating current plate resistance of the tube 10. Since the voltage $e_g$ applied to the grid of tube 10 is proportional to the voltage $e_7$ appearing across capacitor $C_7$ and since the resulting alternating voltage in the plate circuit of tube 10 is proportional to its grid voltage, the alternating voltage acting in the plate circuit is always proportional to the voltage $e_7$. It is thus seen that the high plate resistance of tube 10 which is connected in series with capacitor $C_P$ is coupled to capacitor $C_7$ which is part of the capacity means of the crystal driving circuit.

The vacuum tube voltmeter M2 may be of any type having a relatively high input impedance and is coupled to the capacitor $C_P$ through the capacitor 24. By reason of the calibration circuits of this invention this meter need not be accurately calibrated but may have a purely arbitrary scale or even a single scale mark preferably from about one-half to full scale deflection.

Two switches $S_1$ and $S_2$ are utilized in calibrating the apparatus for measuring the performance index of crystals. Switch $S_1$ has two brushes, the left brush being connected directly to the input circuit of the limiting amplifier 7 of the oscillator O. In the Test position as shown in Fig. 2 this connects the input of the limiting amplifier 7 directly to the capacitor $C_7$ in the crystal driving circuit thereby causing the oscillator to be under control of the crystal for frequency stability. When the switch $S_1$ is moved to the calibrate position Cal the input circuit of the limiting amplifier 7 is connected to the secondary S of the output transformer in the oscillator. The reason for this change in connection will be described later. The right-hand brush of switch $S_1$ in the Test position makes no operative connection in the circuit. However, in the calibrating position this brush places a short-circuit across the crystal 1 thereby also short-circuiting the stray capacitance $C_x$. In this position of the switch $S_1$ the crystal 1 is no longer in the circuit of the oscillator so that this circuit is no longer resonant and consequently the voltage appearing across the capacitor $C_7$ reduces to a relatively low value. Since, in the test position, this voltage across the capacitor $C_7$ is employed as the feedback voltage it will be obvious that when the switch $S_1$ is moved to the calibrate position the feedback voltage would get very low if the feedback connection were not changed from across the capacitor $C_7$ to directly across the output of the oscillator O. Therefore, to maintain oscillations without having to introduce excessive gain in the oscillator circuit it is desirable to transfer the feedback circuit connection from across the capacitor $C_7$ to directly across the output coil of the output transformer. The oscillator will not be expected to operate at the frequency of the crystal but at some other frequency. Since this calibrating position is, as hereinafter more fully described, merely used to obtain the ratio of voltages across two series-connected capacitors the actual frequency of the oscillator for this part of the calibration procedure is immaterial and has no effect upon the accuracy of the measurements.

The other calibrating switch $S_2$ is shown to have three positions. The upper position is labeled Cal 1, the middle position Test and the lower position Cal 2. The use of these three positions will be described more fully later. At this point, however, it will be noted that when the switch $S_2$ is moved to its upper calibrate position, denoted Cal 1, the attenuator A, and consequently the input circuit of the pentode 10 and meter circuit, is uncoupled from the crystal driving circuit and connected directly across the generator. Then when the switch $S_1$ is also on its calibrate position the crystal is short-circuited and series-connected capacitors $C_6$ and $C_7$ are also connected directly across the generator. When switch $S_2$ is moved to its Cal 2 position this same attenuator is again uncoupled from the crystal driving circuit and connected directly across the calibrating resistor $R_A$. The left-hand switch brush of switch $S_2$ as well as the connection from switch points 25 and 26 through conductor 27 to ground is for shielding purposes as will be more particularly described later in connection with Figs. 6 and 7. It can be shown that if the plate resistance $R_2$ of pentode 10 is large compared with the reactance $X_{C_P}$ it is not necessary that the calibrating network $R_A$, $C_A$ be connected to a source having exactly the same frequency as the crystal. Thus a separate alternating current source may be used for all the calibration work. However, for economy of construction, simplicity of design and also for the sake of increased precision it is preferable that the same source used for driving the crystal also be used during calibration.

Due to the non-linear amplitude-frequency characteristic of some crystals and the non-linear amplitude-performance index characteristic of others, the voltage level at which the tests are made should be specified. This voltage level will usually be the voltage at which the crystal is ultimately expected to operate in the commercial oscillator. In order to aid in setting this voltage at the proper level a vacuum tube voltmeter M3 is temporarily connected across test terminals 2 and 3 as shown in Fig. 2. This meter is later removed from the circuit before the actual measurement of the performance index is made and before the set is calibrated. The exact manner in which this meter M3 is used will be described in greater detail later.

Figure 3:
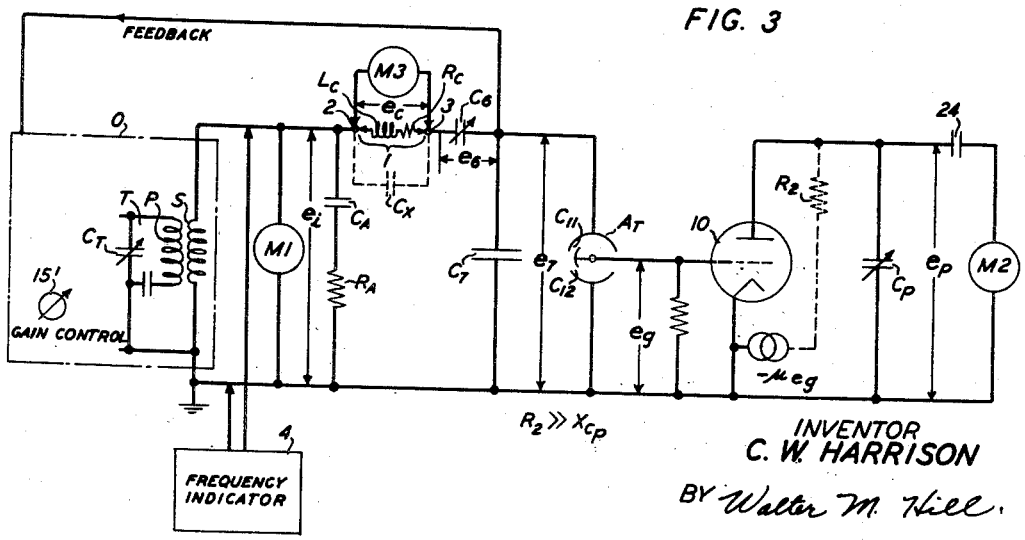

While some variation will obviously be possible in operating the above-described apparatus to measure the performance index of a crystal it is preferred that the following procedure be followed. With both switches $S_1$ and $S_2$ in their Test positions the circuit will appear as shown in Fig. 3. Variable capacitor $C_6$ should be adjusted until the total shunt capacitance presented by the test set to the crystal is equal to that of the commercial oscillator. This total capacitance $C_2$ is expressed by Equation 3 above. The value of this capacitance determines the exact frequency between the resonant and antiresonant points of the crystal at which the crystal will oscillate when in the commercial oscillator. It is therefore important that this capacitance be adjusted very accurately. It is preferable that the accuracy of this adjustment be observed by indirect means. Knowing the exact frequency at which the crystal 1 is expected to operate in the commercial oscillator the frequency indicator 4 is observed while capacitor $C_6$ is varied. When capacitor $C_6$ has been properly adjusted the frequency as indicated by the frequency indicator 4 will be exactly equal to the frequency at which the commercial oscillator is to operate and the shunting capacitance has been adjusted by $C_6$ to be exactly equal to the capacitance which is to be presented by the commercial oscillator. This capacitance is mathematically defined for the test circuits by Equation 3 above.

Now with the calibrating switches $S_1$ and $S_2$ still in their Test positions (Fig. 3) the capacitor $C_T$ in the oscillator circuit should be adjusted until meter M2 reads its maximum deflection. This merely adjusts the tuned circuit T comprising the primary P of the output transformer of the oscillator and its tuning condenser $C_T$ to resonate at the oscillating frequency of the crystal to be tested.

The test oscillator gain should be adjusted by adjusting the manual gain control dial 15' until meter M3 connected across the crystals reads the voltage $e_c$. This voltage may be defined as the required oscillating voltage which will appear across the crystal in the commercial oscillator. The voltage read by meter M1 is observed and this voltage noted as $e_1$. The vacuum tube voltmeter M3 should then be removed from across the crystal as this meter must not be left in the circuit when the performance index measurement is made.

Figure 4:
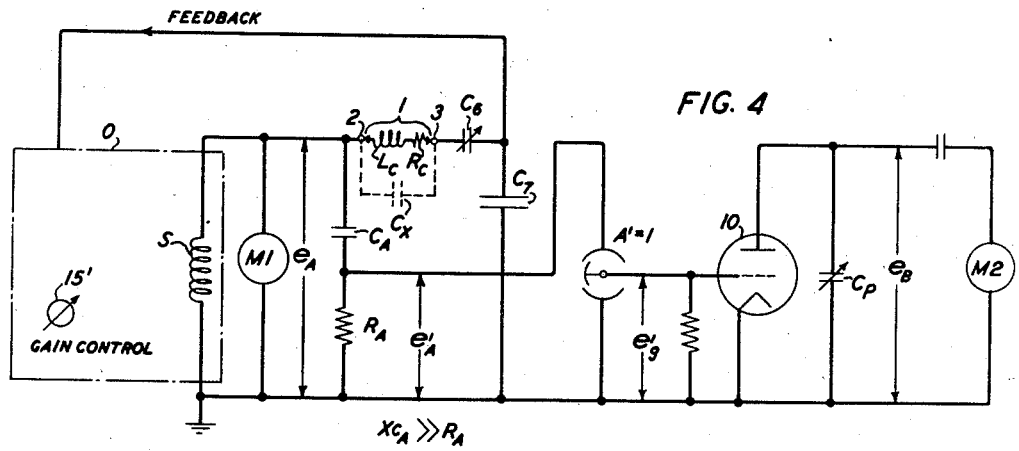
Figs. 4 and 5 are circuits set up in Fig. 2 during calibration, Fig. 4 disclosing the circuits set up when the switch $S_1$ is in its Test position and switch $S_2$ is in the Cal 2 position, while Fig. 5 discloses the circuits set up in Fig. 2 when switch $S_1$ is set to its Cal position while switch $S_2$ may be set on either its Test position or its Cal 1 position.

With the switch $S_1$ left in its Test position and with switch $S_2$ moved to its Cal 2 position the attenuator A should be adjusted to equal A' which may be any value but preferably is arbitrarily made equal to unity. The circuits thus set up are shown in Fig. 4. The calibrating voltage $e_A$ across the calibrating circuit comprising capacitor $C_A$ and resistor $R_A$, may be made any arbitrary value by changing the adjustment of the gain control. However, it is convenient to leave this voltage $e_A$ equal to the input test voltage $e_1$ in order to simplify calculations. Ordinarily this condition will automatically obtain by reason of the automatic volume control function of the oscillator so that regardless of the operation of the switches $S_1$ and $S_2$ this voltage will remain constant. In this position of the switches, that is, with switch $S_1$ on its Test position and switch $S_2$ in its Cal 2 position, the capacitor $C_P$ in the output circuit of pentode 10 (or alternatively, the gain of pentode 10) should be adjusted until meter M2 reads any convenient value from about one-half to full scale deflection. This reading should be denoted $e_B$. It may here be stated that since voltage $e_A$ may be of any arbitrary magnitude it may be derived from any alternating current source which is preferably, although not necessarily, of the same frequency as the crystal under test.

With switch $S_1$ still in its Test position, switch $S_2$ should be returned to its Test position so that the circuits of Fig. 3 will again obtain. If the gain control had been changed as discussed in the preceding paragraph it should be readjusted until the test oscillator again produces the same output voltage $e_1$ as read by meter M1 in which case the voltage across the crystal will again be made substantially equal to the voltage $e_c$. The attenuator A should then be adjusted until meter M2 reads a voltage $e_P$ equal to the voltage $e_B$ previously obtained from the adjustments made while switch $S_2$ was in its Cal 2 position. The attenuator reading should be read and this value denoted $A_T$. As the capacity attenuator A can be quite easily made to a high degree of precision this operation greatly relieves the stringent requirements on the linearity and accuracy with which the vacuum tube meter M2 must read.

Figure 5:
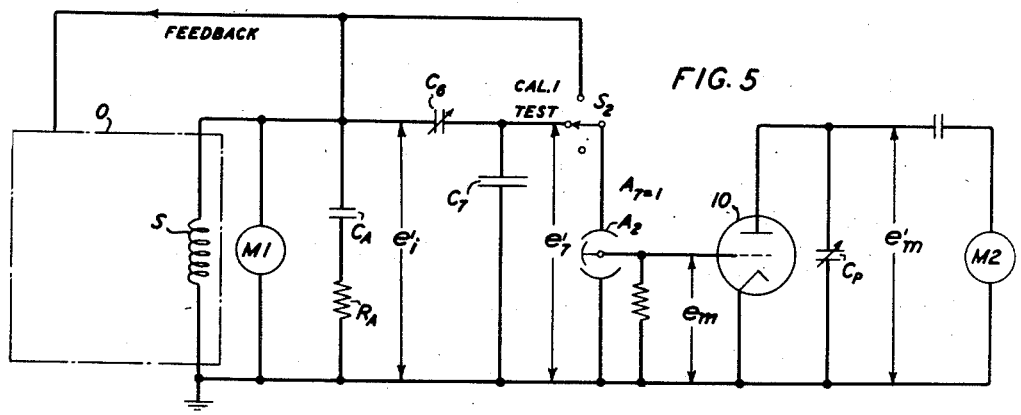

With switch $S_2$ remaining in its Test position move switch $S_1$ to its calibrate position Cal thereby setting up the circuits of Fig. 5. Then with the attenuator A set to equal $A_7$ (which is preferably made unity) adjust the capacitor $C_P$ until the meter M2 reads any convenient value from one-half to full scale deflection. This reading of vacuum tube meter M2 may be denoted $e_m'$.

Referring again to Figs. 2 and 5, the switch $S_1$ should be left at its Cal position while switch $S_2$ is moved to its Cal 1 position. In the simplified circuits shown in Fig. 5 it is now assumed that the switch $S_2$ has been moved to its upper position. With this position of the switches the attenuator A should be readjusted until meter M2 again reads the voltage $e_m'$ previously determined. This position of the attenuator is denoted $A_2$.

The performance index of the crystal under test may now be calculated from the following expression $$PI = K A_T A_2^2 \quad (4)$$

where $$K = \frac{R_A C_A}{C_7} = \text{some multiple of 10}$$

and $A_T$ and $A_2$ are attenuator readings obtained as specified above.

That Equation 4 accurately expresses the absolute value of the performance index of the crystal where the apparatus is operated in the manner indicated above may be demonstrated by the following mathematical analysis. From Equation 1 the following expression may be written:

$$PI = \frac{\omega L_C}{R_C} \cdot \frac{1}{\omega C_2} = \frac{Q_C}{\omega C_2} \quad (5)$$

where $$Q_C = \frac{\omega L_C}{R_C} \quad (5a)$$

In Equations 5 and 5a the quantity $Q_C$ is the Q of the crystal itself when oscillating at the required test frequency. It is the ratio of the reactance to the resistance of the equivalent crystal network shown in Fig. 1B above. The effective circuit Q of the crystal including the stray capacitance $C_x$ may be designated $Q_e$, this quantity expressing the effective Q of the entire network actually appearing at the test terminals 2 and 3. Referring to Fig. 3 it will be seen that $Q_e$ may be expressed as follows remembering that the input capacitance of the attenator A is either made very small compared with the capacitance $C_7$ or it is made substantially constant and included as part of the capacitance $C_7$:

$$Q_e = \frac{e_6 + e_7}{e_i} = \frac{e_7}{e_i}\left(1 + \frac{e_6}{e_7}\right) = \frac{e_7}{e_i}\left(1 + \frac{C_7}{C_6}\right) \quad (6)$$

where voltages $e_1$, $e_6$ and $e_7$ and capacitances $C_6$ and $C_7$ are as shown in Fig. 3.

The quantity $Q_e$ representing the Q of the entire network actually appearing at the test terminals may also be written as follows wherein the capacitance $C_x$ is considered part of the crystal network as shown, for example, between the test terminals of Fig. 3.

$$Q_e = \frac{\omega L_C \left(\frac{1}{\omega C_x} - \omega L_C\right) - R_C^2}{\frac{R_C}{\omega C_x}} \quad (7)$$

From the foregoing description of the circuits of this invention it will be remembered that the test frequency is automatically maintained under control of the crystal to equal the antiresonant frequency of the crystal when shunted by the external capacitance $C_2$. Consequently, the sum of the reactances in the crystal driving circuit around the series path from the driving voltage $e_1$ through the crystal network and through capacitors $C_6$ and $C_7$ must substantially equal zero. Therefore the following relationship obtains:

$$\omega L_C \doteq \frac{1}{\omega C_2} \quad (8)$$

Solving Equations 5a, 7 and 8 simultaneously will yield $$Q_C \doteq Q_e \left(\frac{C_2}{C_2 - C_x}\right) \qquad (9)$$

In deriving Equation 9 it is assumed that the quantity $Q_C{}^2$ is large compared with unity. Equations 3 and 6 may now be solved simultaneously to give $$Q_e = \frac{e_7}{e_i} \cdot \frac{C_7}{(C_2 - C_x)} \qquad (10)$$

Substituting the value of $Q_e$ from Equation 10 into Equation 9 and solving for the ratio of $Q_C$ to $C_2$ gives $$\frac{Q_C}{C_2} \doteq \frac{e_7}{e_i} \cdot \frac{C_7}{(C_2 - C_x)^2} \qquad (11)$$

The performance index was expressed by Equation 5 in terms of the ratio of $Q_C$ to $C_2$ and the test frequency. From Equations 5 and 11 this may be written $$PI = \frac{e_7}{e_i} \cdot \frac{C_7}{\omega(C_2 - C_x)^2} \qquad (12)$$

The voltage $e_7$ will cause vacuum tube voltmeter M2 to respond in a manner governed by the intervening circuits. This relationship is derived in a conventional manner by considering the output circuit of the pentode 10 as comprising a source of electromotive force of magnitude equal to the product of the amplification factor $\mu$ of the tube and the alternating current grid voltage $e_g$ connected in series with the alternating current plate resistance $R_2$ of the tube and the capacitance $C_p$ as shown schematically in Fig. 3. The grid voltage $e_g$ is expressed in terms of the voltage $e_7$ across capacitor $C_7$ and the attenuation factor $A_T$, which is the setting of the attenuator A when the test is being made with the switches in the positions shown in Fig. 3. This expression is:

$$e_7 = A_T e_g \qquad (13)$$

The relationship in the output circuit of the tube 10 is expressed as:

$$\mu e_g = \frac{e_p}{X_{C_p}} \sqrt{R_2{}^2 + X_{C_p}{}^2} \qquad (14)$$

where $X_{C_p}$ = Reactance of capacitor $C_p$ at the test frequency
$e_p$ = Voltage across capacitor $C_p$
$R_2$ = Alternating current plate resistance of tube 10.

Equations 13 and 14 may be rewritten as follows remembering that the ratio $\mu/R_2$ is equal to $G_m$, the mutual conductance of tube 10.

$$e_7 = A_T \frac{e_p \omega C_p}{G_m} \sqrt{1 + \left(\frac{X_{C_p}}{R_2}\right)^2} \qquad (15)$$

Substituting the value of $e_7$ as defined by Equation 15 into Equation 12 will yield the following expression for the performance index:

$$PI \doteq A_T \cdot \frac{C_p}{G_m} \cdot \frac{e_p}{e_i} \cdot \frac{C_7}{(C_2 - C_x)^2} \cdot \sqrt{1 + \left(\frac{X_{C_p}}{R_2}\right)^2} \qquad (16)$$

All of the quantities in Equation 16 are constant, except $A_T$ and $e_p$. It is therefore apparent that if the constant quantities could be evaluated and if meter M2 were accurately calibrated, the instrument would be made direct reading, in which case the attenuator reading $A_T$ would preferably be made equal to some multiple of ten and the performance index would be numerically equal to the reading of meter M2 or some multiple of ten thereof. However, the evaluation of the performance index from Equation 16 has three obvious difficulties. First, the ratio of capacitance $C_p$ to the mutual conductance $G_m$ is difficult to evaluate numerically; second, the ratio of the two different voltages $e_p$ to $e_i$ is difficult to get accurately if their absolute values must first be obtained; third, the measurement is dependent upon the gain of the amplifier stage comprising tube 10. All of these difficulties are overcome by the internal calibration circuits provided by this invention.

Now the ratio of the capacitance $C_p$ to the mutual conductance $G_m$ is evaluated by the calibration circuit of Fig. 4. The current through the calibrating network comprising calibrating capacitor $C_A$ and calibrating resistor $R_A$ (again neglecting the negligibly small current through the attenuator A) produces a total voltage drop of $e_A$ and a voltage drop of $e_A'$ across the calibrating resistor $R_A$ alone as shown in Fig. 4. This gives the following relations remembering that the resistance of $R_A$ is small compared with the reactance of the capacitor $C_A$.

$$\frac{e_A'}{R_A} = \frac{e_A}{\sqrt{R_A{}^2 + X_{C_A}{}^2}} = \frac{e_A \omega C_A}{\sqrt{\left(\frac{R_A}{X_{C_A}}\right)^2 + 1}} \doteq e_A \omega C_A \qquad (17)$$

Also by analogy from Equation 15 the following expression can be written for the ratio of the capacitance $C_p$ to the mutual conductance $G_m$.

$$\frac{C_p}{G_m} = \frac{e'_A}{\omega A' e_B} \cdot \frac{1}{\sqrt{1 + \left(\frac{X_{C_p}}{R_2}\right)^2}} \qquad (18)$$

where $A'$ and $e_B$ are, respectively, the attenuator setting and the voltage across $C_p$ during this part of the calibration procedure.

Solving Equation 17 for the voltage $e_A'$ and substituting this value in Equation 18 will determine the ratio of the capacitance $C_p$ to the mutual conductance $G_m$ which ratio may be expressed as $$\frac{C_p}{G_m} \doteq \frac{e_A C_A R_A}{A' e_B} \cdot \frac{1}{\sqrt{1 + \left(\frac{X_{C_p}}{R_2}\right)^2}} \qquad (19)$$

At this stage of the calibration the attenuator is preferably set at unity so that $A'$ equals 1. With this in mind and substituting the value of $C_p/G_m$ from Equation 19 into Equation 16 the following equation for the performance index results $$PI \doteq A_T \left(\frac{e_A}{e_B} \cdot \frac{e_p}{e_i}\right) \cdot \frac{C_A R_A C_7}{(C_2 - C_x)^2} \qquad (20)$$

It will be remembered that in connection with the description of the operation of this apparatus the voltage $e_A$ during calibration is maintained equal to the input test voltage $e_i$ and since these voltages may both be read on the same meter M1 and with the same scale factor the value of the performance index is entirely independent of the calibration of this meter. As a matter of fact the automatic volume control feature of the oscillator will actually keep these voltages equal without any special adjustment being necessary. It will also be remembered in connection with the description of the operation of this apparatus that when the switch $S_1$ was in the Test position and the switch $S_2$ in its Cal 2 position as shown in Fig. 4, the voltage $e_B$ was determined. Then later with the two switches $S_1$ and $S_2$ in their test positions so that the circuits of Fig. 3 were set up the voltage $e_P$ was adjusted by adjusting the attenuator A until the voltage equals the voltage $e_B$. With these adjustments it will be obvious that the voltage ratios appearing within the brackets in Equation 20 above will reduce to unity and that the calibration of either meter M1 or M2 is immaterial as they are always caused to read the same deflections. The accuracy with which the absolute value of the performance index may be determined therefore depends primarily upon the accuracy with which the capacity attenuator A is calibrated and the accuracy with which $C_A$, $R_A$, $C_7$, $C_2$ and $C_X$ may be determined.

The variable capacity attenuator A may be calibrated to within a very small percentage error. The capacitance of $C_7$ is relatively large, being in the order of 200 to 250 micromicrofarads and consequently can be accurately determined to within a fraction of a per cent error. While the capacitance $C_A$ is relatively small in a practical embodiment, the product of the capacitance $C_A$ times the resistance $R_A$ may be rather closely adjusted by adjusting the value of the resistance $R_A$. The factor in the numerator of Equation 20, may be quite accurately determined by direct measurement without difficulty. For high frequency crystals, however, the capacitance $C_X$ is not negligibly small compared with the external shunting capacitance $C_2$ so that errors in their absolute determination will cause considerable error in the square of their difference. Accurate direct measurement of these capacitances is, as a practical matter, either impossible or at least extremely difficult. However, by the additional internal calibrating means of this invention, this difficulty is easily overcome.

For this purpose switch $S_1$ is placed in the calibrate position Cal to temporarily short both the crystal and the stray capacitance $C_X$ thereby setting up the circuit shown in Fig. 5. Switch $S_2$ is first set to its Test position while the attenuator is arbitrarily set to read any value $A_7$ whereupon the voltage across capacitor $C_7$ is applied to the meter circuit to read a voltage $e_m'$ on meter M2. Switch $S_2$ is then set on its Cal 1 position whereupon the voltage across capacitors $C_6$ and $C_7$ in series is applied to the meter circuit. The attenuator is readjusted so meter M2 again reads $e_m'$. The new reading of the attenuator is designated $A_2$. The effect of these adjustments may be analyzed as follows keeping in mind the test procedure previously described.

With the circuits as shown in Fig. 5 the input voltage applied to capacitors $C_6$ and $C_7$ in series is $e_i'$ and the voltage across capacitor $C_7$ alone is $e_7'$. Current through these capacitors is then equal to $$e_7'\omega C_7 = \frac{e_i'\omega C_6 C_7}{C_6 + C_7} \quad (21)$$

Solving Equation 21 for the ratio of $e_i'$ to $e_7'$ and squaring we may write $$\left(\frac{e_i'}{e_7'}\right)^2 = C_7^2 \left(\frac{C_6 + C_7}{C_6 C_7}\right)^2 \quad (22)$$

From Equation 3 we may write $$(C_2 - C_X)^2 = \left(\frac{C_6 C_7}{C_6 + C_7}\right)^2 \quad (23)$$

Substituting Equation 23 into Equation 22 will yield $$\left(\frac{e_i'}{e_7'}\right)^2 = \frac{C_7^2}{(C_2 - C_X)^2} \quad (24)$$

Now meter M2 was made to read $e_m'$ for each position of switch $S_2$ by adjusting the attenuator A. Since the frequency is the same, voltage $e_m'$ results in each case from a voltage $e_m$ applied to the control grid of pentode 10. By reason of the action of the attenuator, voltage $e_i'$ is equal to the product $A_2 e_m$ and voltage $e_7'$ is equal to the product $A_7 e_m$. The ratio of voltage $e_i'$ to $e_7'$ is therefore equal to the ratio of the attenuator readings $A_2$ to $A_7$. Substituting this ratio in Equation 24 results in $$\left(\frac{A_2}{A_7}\right)^2 = \frac{C_7^2}{(C_2 - C_X)^2} = C_7 \frac{C_7}{(C_2 - C_X)^2} \quad (25)$$

Solving Equation 25 for the ratio of capacitance $C_7$ to the square of the difference between the capacitance $C_2$ and $C_X$ and substituting in Equation 20 (remembering that the voltage ratios within the brackets are made equal to unity) will yield $$PI \doteq A_T \frac{C_A R_A}{C_7}\left(\frac{A_2}{A_7}\right)^2 \quad (26)$$

As previously stated the product $C_A R_A$ and the capacitance $C_7$ may be measured and adjusted to within very close limits. The ratio of the product of $C_A R_A$ to $C_7$ is a design constant K which is preferably made equal to some multiple of 10. Also it is to be remembered that the attenuator may be adjusted during calibration so that its reading $A_7$ may be equal to any arbitrary value within range. It is preferable for simplicity, however, to make this adjustment equal unity. Consequently Equation 26 reduces to Equation 4 and the accuracy of the absolute calibration of the instrument is demonstrated as dependent only upon some very close approximations requiring that $Q_C^2 \gg 1$, $X_{C_A} \gg R_A$, and that $C_7 \gg C_6$ and also upon the accuracy with which the constant K can be determined and the accuracy with which the attenuator A can be calibrated. As previously stated capacity attenuators of this type can be calibrated to read consistently within very much closer limits than can vacuum tube voltmeters and the calibration is substantially independent of frequency.

Referring again to Fig. 2 where switch $S_2$ is shown with two brushes it is fully apparent that the basic circuits of the invention may be set up by the right-hand brush alone. It is also observed that except for the Test position the left-hand brush need not appear in the basic circuit schematic. This left-hand brush is used only as a capacity shielding means to eliminate the effect of a spurious switch capacitance which for a compactly constructed switch has been found at high frequencies to destroy the accuracy of the first calibration involving the standard capacitor and resistor $C_A$ and $R_A$ respectively. This shielding effect is illustrated in Figs. 6 and 7 where the stray switch capacitance is designated $C_S$ and where it is assumed that switch $S_2$ is in its Cal 2 position.

Figure 6:
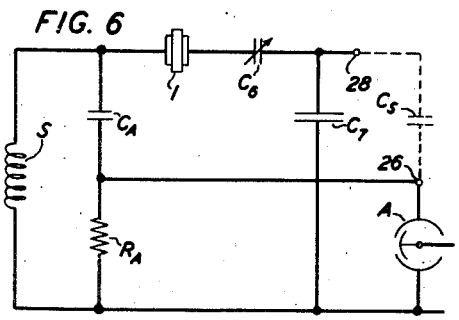
Figs. 6 and 7 are explanatory of a shielding feature employed in connection with switch $S_2$.

In Fig. 6 it is further assumed that switch $S_2$ has only one brush, for example, the left brush with switch points 25, 26 and 28 and switch point 25 is connected to test terminal 2 and switch point 26 is connected to the junction between standard capacitor $C_A$ and standard resistor $R_A$. This assumption is made only to illustrate the effect of not utilizing the shielding connections disclosed in Fig. 2. With such connections it is apparent that the stray capacitance $C_S$ would couple switch point 28 connected to the junction of capacitors $C_6$ and $C_7$ with switch point 26 connected to the upper stator of capacity attenuator A and to the junction between $C_A$ and $R_A$. Now at resonance several volts appear as a drop across capacitor $C_7$ while very much less voltage appears across the relatively low calibrating resistor $R_A$ which alone should be connected to the attenuator A as shown in Fig. 4. By reason of this stray coupling the voltage input to the attenuator A is raised somewhat above the calculated value thereby introducing an error in the calibration.

Figure 7:
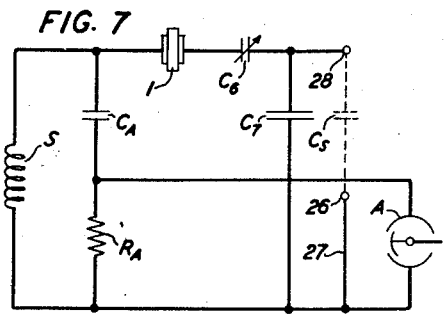

Fig. 7 shows the effect of using two brushes in the preferred manner as illustrated in Fig. 2. When switch $S_2$ is in the Cal 2 position the small capacitance existing between switch point 28 and switch points 25 and 26 is connected across large capacitance $C_7$ by conductor 27 where it is entirely harmless in its effect. The only voltage now applied to the input side of the attenuator A is that appearing across the calibrating resistor $R_A$ just as intended.

What is claimed is:

1. A self-calibrating circuit for measuring the performance index of a piezoelectric crystal comprising a substantially zero output impedance source of alternating electric energy, a crystal to be tested, a crystal driving circuit comprising two serially connected capacitors in series with the source and the crystal, one of said capacitors being large compared with the other, a feedback circuit in said source connected to at least one of said capacitors whereby the frequency of the source is controlled by the crystal under test, a series circuit of a resistance means and a capacitive reactance means, the reactance whereof is small compared with the resistance, a coupling circuit for coupling said series circuit across the larger of said two capacitors so as to have impressed on said series circuit a voltage substantially proportional to the voltage across said larger capacitor, a voltage measuring means connected across said capacitive reactance whereby the readings thereof will be a measure of the performance index of the crystal and a calibrating means therefor comprising a calibrating capacitor connected in series circuit with a calibrating resistor, a calibrating source of alternating electric energy connected across the last-named series circuit, a first switching means for temporarily disconnecting said coupling circuit from said larger capacitor and selectively reconnecting it across either the calibrating capacitor and calibrating resistor in series or the calibrating resistor alone, and a second switching means for temporarily short-circuiting the crystal.

2. A self-calibrating circuit for measuring the performance index of a piezoelectric crystal comprising a substantially zero output impedance source of alternating electric energy, a crystal to be tested, a crystal driving circuit comprising two serially connected capacitors in series with the source and the crystal, one of said capacitors being large compared with the other, a feedback circuit in said source connected to at least one of said capacitors whereby the frequency of the source is controlled by the crystal under test, a vacuum tube having input and output circuits, a capacitive reactance in series with the output circuit small compared to the resistance of said circuit, a circuit coupling the vacuum tube input circuit across the larger of said two capacitors, a voltage measuring means connected across said capacitive reactance whereby the reading thereof will be a measure of the performance index of the crystal, and a calibrating means therefor comprising a calibrating capacitor connected in series circuit with a calibrating resistor, a calibrating source of alternating electric energy connected across the last-named series circuit, a first switching means for temporarily disconnecting the vacuum tube input circuit from said larger capacitor and selectively reconnecting it across either the calibrating capacitor and calibrating resistor in series, or the calibrating resistor alone, and a second switching means for temporarily short-circuiting the crystal.

3. A self-calibrating circuit for measuring the performance index of a piezoelectric crystal comprising a substantially zero output impedance source of alternating electric energy, a crystal to be tested, a crystal driving circuit comprising two serially connected capacitors in series with the source and the crystal, one of said capacitors being large compared with the other, a feedback circuit in said source connected to at least one of said capacitors whereby the frequency of the source is controlled by the crystal under test, a series circuit of a resistance means and a capacitive reactance means, the reactance whereof is small compared with the resistance, a coupling circuit for coupling said series circuit across the larger of said two capacitors so as to have impressed on said series circuit a voltage substantially proportional to the voltage across said larger capacitor, a voltage measuring means connected across said capacitive reactance whereby the readings thereof will be a measure of the performance index of the crystal, and a calibrating means therefor comprising a calibrating capacitor connected in series circuit with a calibrating resistor and across said source of electric energy, a first switching means for temporarily disconnecting said coupling circuit from said larger capacitor and selectively reconnecting it across either the calibrating capacitor and calibrating resistor in series, or the calibrating resistor alone, and a second switching means for temporarily short-circuiting the crystal.

4. A self-calibrating circuit for measuring the performance index of a piezoelectric crystal comprising a substantially zero output impedance source of alternating electric energy, a crystal to be tested, a crystal driving circuit comprising two serially connected capacitors in series with the source and the crystal, one of said capacitors being large compared with the other, a feedback circuit in said source connected to at least one of said capacitors whereby the frequency of the source is controlled by the crystal under test, a vacuum tube having input and output circuits, a capacitive reactance in series with the output circuit small compared to the resistance of said circuit, a circuit coupling the vacuum tube input circuit across the larger of said two capacitors, a voltage measuring means connected across said capacitive reactance whereby the readings thereof will be a measure of the performance index of the crystal, and a calibrating means therefor comprising a calibrating capacitor connected in series circuit with a calibrating resistor and across said source of electric energy, a first switching means for temporarily disconnecting the vacuum tube input circuit from said larger capacitor and selectively reconnecting it across either the calibrating capacitor and calibrating resistor in series, or the calibrating resistor alone, and a second switching means for temporarily short-circuiting the crystal.

5. The combination in accordance with claim 1 wherein said first switching means comprises a selector switch having at least three switch points and a brush, a circuit connecting the brush to the coupling circuit, one circuit path from one of the switch points to the junction between said two serially connected capacitors, a second circuit path connecting a second switch point to one terminal of said calibrating capacitor, and a third circuit path connecting a third switch point to the other terminal of said calibrating capacitor.

6. The combination in accordance with claim 2 wherein said first switching means comprises a selector switch having at least three switch points and a brush, a circuit connecting the brush to the vacuum tube input circuit, one circuit path from one of the switch points to the junction between said two serially connected capacitors, a second circuit path connecting a second switch point to one terminal of said calibrating capacitor and a third circuit path connecting a third switch point to the other terminal of said calibrating capacitor.

7. The combination in accordance with claim 3 wherein said first switching means comprises a selector switch having at least three switch points and a brush, a circuit connecting the brush to the coupling circuit, one circuit path from one of the switch points to the junction between said two serially connected capacitors, a second circuit path connecting a second switch point to one terminal of said calibrating capacitor, and a third circuit path connecting a third switch point to the other terminal of said calibrating capacitor.

8. The combination in accordance with claim 4 wherein said first switching means comprises a selector switch having at least three switch points and a brush, a circuit connecting the brush to the vacuum tube input circuit, one circuit path from one of the switch points to the junction between said two serially connected capacitors, a second circuit path connecting a second switch point to one terminal of said calibrating capacitor, and a third circuit path connecting a third switch point to the other terminal of said calibrating capacitor.

CHARLES W. HARRISON.

REFERENCES CITED

The following references are of record in the file of this patent:

UNITED STATES PATENTS

| Number | Name | Date |
|---|---|---|
| 2,137,787 | Snow | Nov. 22, 1938 |
| 2,162,520 | Whitaker | June 13, 1939 |
| 2,337,759 | Loughlin | Dec. 28, 1943 |